United States Patent
Schweitzer, III et al.

(10) Patent No.: US 7,692,538 B2
(45) Date of Patent: Apr. 6, 2010

(54) USER INTERFACE FOR MONITORING A PLURALITY OF FAULTED CIRCUIT INDICATORS

(75) Inventors: Edmund O. Schweitzer, III, Pullman, WA (US); Luther S. Anderson, Pullman, WA (US); Mark J. Bosold, Pullman, WA (US); Douglas A. Park, Palouse, WA (US); Laurence Virgl Feight, Island Lake, IL (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 0 days.

(21) Appl. No.: 11/750,947

(22) Filed: May 18, 2007

(65) Prior Publication Data

US 2007/0268644 A1  Nov. 22, 2007

Related U.S. Application Data

(60) Provisional application No. 60/802,076, filed on May 19, 2006.

(51) Int. Cl.
*G08B 1/08* (2006.01)

(52) U.S. Cl. .................... 340/539.1; 340/638; 340/639; 324/500; 324/522

(58) Field of Classification Search ............. 340/539.1, 340/638, 639, 651; 324/500; 455/419, 553.1, 455/73.1, 41.2; 361/63, 60, 62
See application file for complete search history.

(56) References Cited

U.S. PATENT DOCUMENTS

| | | | |
|---|---|---|---|
| 2,379,664 A | 7/1945 | Stanko |
| 2,928,048 A | 3/1960 | Postal |
| 2,967,267 A | 1/1961 | Steinman |
| 3,292,579 A | 12/1966 | Buchanan |
| 3,296,493 A | 1/1967 | Whittaker |
| 3,476,997 A | 11/1969 | Otzipka |
| 3,525,903 A | 8/1970 | Morris |
| 3,621,334 A | 11/1971 | Burns |
| 3,676,740 A | 7/1972 | Schweitzer |
| 3,702,966 A | 11/1972 | Schweitzer |
| 3,708,724 A | 1/1973 | Schweitzer |
| 3,715,742 A | 2/1973 | Schweitzer |

(Continued)

OTHER PUBLICATIONS

Handheld receiver by Joslyn Hi-Voltage.*

(Continued)

*Primary Examiner*—George A Bugg
*Assistant Examiner*—Hongmin Fan
(74) *Attorney, Agent, or Firm*—Eugene M. Cummings, P.C.

(57) ABSTRACT

A user interface for a wireless device used to monitor multiple groups of faulted circuit indicators. Each group of faulted circuit indicators includes a radio interface unit, which is coupled to each of the faulted circuit indicators in the group. The user interface includes an identification indicator, which includes a plurality of radio interface unit status indicators, each of which corresponds to a particular radio interface unit, and which indicates a selected radio interface unit. The user interface also includes a way indicator comprising a plurality of faulted circuit indicator status indicators, each of which corresponds to a particular faulted circuit indicator coupled to the selected radio interface unit. In addition, each radio interface unit status indicator indicates whether a particular radio interface unit coupled to a faulted circuit indicator is asserting a fault condition.

45 Claims, 6 Drawing Sheets

U.S. PATENT DOCUMENTS

| | | |
|---|---|---|
| 3,781,682 A | 12/1973 | Schweitzer |
| 3,816,816 A | 6/1974 | Schweitzer |
| 3,866,197 A | 2/1975 | Schweitzer |
| 3,876,911 A | 4/1975 | Schweitzer |
| 3,906,477 A | 9/1975 | Schweitzer |
| 3,972,581 A | 8/1976 | Oldham |
| 3,974,446 A | 8/1976 | Schweitzer |
| 4,029,951 A | 6/1977 | Berry |
| 4,034,360 A | 7/1977 | Schweitzer |
| 4,038,625 A | 7/1977 | Tompkins |
| 4,045,726 A | 8/1977 | Schweitzer |
| 4,063,171 A | 12/1977 | Schweitzer |
| 4,086,529 A | 4/1978 | Schweitzer |
| 4,112,292 A | 9/1978 | Varvel |
| 4,144,485 A | 3/1979 | Akita |
| 4,165,528 A | 8/1979 | Schweitzer |
| 4,186,986 A | 2/1980 | Shoemaker |
| 4,199,741 A | 4/1980 | Serrus Paulet |
| 4,234,847 A | 11/1980 | Schweitzer |
| 4,251,770 A | 2/1981 | Schweitzer |
| 4,288,743 A | 9/1981 | Schweitzer |
| 4,375,617 A | 3/1983 | Schweitzer |
| 4,414,543 A | 11/1983 | Schweitzer |
| 4,424,512 A | 1/1984 | Schweitzer |
| 4,438,403 A | 3/1984 | Schweitzer |
| 4,458,198 A | 7/1984 | Schweitzer |
| 4,495,489 A | 1/1985 | Schweitzer |
| 4,536,758 A | 8/1985 | Schweitzer |
| 4,686,518 A | 8/1987 | Schweitzer |
| 4,689,752 A | 8/1987 | Fernandes |
| 4,709,339 A | 11/1987 | Fernandes |
| 4,794,332 A | 12/1988 | Schweitzer |
| 4,795,982 A | 1/1989 | Schweitzer |
| 4,829,298 A | 5/1989 | Fernandes |
| 4,940,976 A | 7/1990 | Gastouniotis |
| 4,996,624 A | 2/1991 | Schweitzer |
| 5,008,651 A | 4/1991 | Schweitzer |
| 5,038,246 A | 8/1991 | Durivage |
| 5,070,301 A | 12/1991 | Schweitzer |
| 5,089,928 A | 2/1992 | Durivage |
| 5,136,457 A | 8/1992 | Durivage |
| 5,136,458 A | 8/1992 | Durivage |
| 5,150,361 A | 9/1992 | Wieczorek |
| 5,153,565 A | 10/1992 | Schweitzer |
| 5,168,414 A | 12/1992 | Horstmann |
| 5,196,682 A | 3/1993 | Englehardt |
| 5,220,311 A | 6/1993 | Schweitzer |
| 5,298,894 A | 3/1994 | Cerney |
| 5,420,502 A | 5/1995 | Schweitzer |
| 5,438,329 A | 8/1995 | Gastouniotis |
| 5,495,239 A | 2/1996 | Ouellete |
| 5,519,527 A | 5/1996 | Panton |
| 5,550,476 A | 8/1996 | Lau |
| 5,565,783 A | 10/1996 | Lau |
| 5,648,726 A | 7/1997 | Le |
| 5,656,931 A | 8/1997 | Lau et al. |
| 5,659,300 A | 8/1997 | Dresselhuys |
| 5,677,623 A | 10/1997 | Schweitzer |
| 5,677,678 A | 10/1997 | Schweitzer |
| 5,701,121 A | 12/1997 | Murdoch |
| 5,726,646 A * | 3/1998 | Bane et al. ............. 340/870.03 |
| 5,793,214 A | 8/1998 | Wakamatsu |
| 5,821,869 A | 10/1998 | Schweitzer |
| 5,825,303 A | 10/1998 | Bloss |
| 5,877,703 A | 3/1999 | Bloss, Jr. et al. |
| 5,889,399 A | 3/1999 | Schweitzer |
| 6,002,260 A | 12/1999 | Lau |
| 6,014,301 A | 1/2000 | Schweitzer |
| 6,016,105 A | 1/2000 | Schweitzer |
| 6,029,061 A | 2/2000 | Kohlschmidt |
| 6,072,405 A | 6/2000 | Sears |
| 6,078,785 A | 6/2000 | Bush |
| 6,133,724 A | 10/2000 | Schweitzer |
| 6,177,883 B1 | 1/2001 | Jannetti |
| 6,188,216 B1 | 2/2001 | Fromer |
| 6,239,722 B1 | 5/2001 | Colton |
| 6,326,905 B1 | 12/2001 | Walters |
| 6,349,248 B1 | 2/2002 | Dean |
| 6,366,217 B1 | 4/2002 | Cunningham |
| 6,380,733 B1 | 4/2002 | Apel |
| 6,414,605 B1 | 7/2002 | Walden |
| 6,429,661 B1 | 8/2002 | Schweitzer |
| 6,433,698 B1 | 8/2002 | Schweitzer |
| 6,479,981 B2 | 11/2002 | Schweitzer |
| 6,525,504 B1 | 2/2003 | Nygren |
| 6,573,707 B2 | 6/2003 | Kiriyama |
| 6,577,608 B1 | 6/2003 | Moon |
| 6,617,976 B2 | 9/2003 | Walden |
| 6,671,824 B1 | 12/2003 | Hyland |
| 6,736,646 B2 | 5/2004 | Takahashi |
| 6,753,792 B2 | 6/2004 | Bechwth |
| 6,759,933 B2 | 7/2004 | Fallak |
| 6,796,821 B2 | 9/2004 | Cairns |
| 6,798,211 B1 | 9/2004 | Rockwell |
| 6,828,906 B2 | 12/2004 | Malcolm |
| 6,944,555 B2 | 9/2005 | Blackett |
| 7,391,299 B2 * | 6/2008 | Bender et al. ............... 340/292 |
| 2002/0089802 A1 | 7/2002 | Beckwth |
| 2003/0040897 A1 * | 2/2003 | Murphy et al. ................ 703/18 |
| 2003/0119568 A1 | 6/2003 | Menard |
| 2003/0153368 A1 | 8/2003 | Bussan |
| 2003/0174067 A1 | 9/2003 | Soliman |
| 2003/0178290 A1 | 9/2003 | Schilling |
| 2003/0179149 A1 | 9/2003 | Savage |
| 2004/0005809 A1 | 1/2004 | Suzuki |
| 2004/0032340 A1 | 2/2004 | Lingafeldt |
| 2004/0036478 A1 | 2/2004 | Logvinov |
| 2004/0067366 A1 | 4/2004 | Gorczyca |
| 2004/0113810 A1 | 6/2004 | Mason |
| 2004/0214616 A1 | 10/2004 | Malcom |
| 2004/0233159 A1 | 11/2004 | Badarneh |
| 2005/0040809 A1 | 2/2005 | Uber |
| 2005/0068193 A1 | 3/2005 | Osterloh |
| 2005/0068194 A1 | 3/2005 | Schleich |
| 2005/0079818 A1 | 4/2005 | Atwater |
| 2005/0087599 A1 | 4/2005 | Ward |
| 2005/0110656 A1 | 5/2005 | Patterson |
| 2005/0132115 A1 | 6/2005 | Leach |
| 2005/0151659 A1 * | 7/2005 | Donovan et al. ............ 340/664 |
| 2005/0205395 A1 | 9/2005 | Dietrich |
| 2005/0215280 A1 | 9/2005 | Twitchell, Jr. |
| 2006/0084419 A1 | 4/2006 | Rocamora |
| 2007/0179547 A1 * | 8/2007 | Armstrong et al. ............ 607/29 |

OTHER PUBLICATIONS

Fisher Priece Division of Pacific Scientific—Faulted Circuit Indicators—Technical Applications Data 1995; Anh Le, Dave Donovan, Bill Doherty.

Power Mangement Using the Embedded Stand-Alone Wake-Up Protocol. Rev. 2 (Aug. 2002); ATMEL AT86RF211.

Radio Receivers Series 1560 Handheld or RTU/SCADA—Joslyn Hi-Voltage—http://www.joslynhivoltage.com/cat1560.htm and http://www.joslynhivoltage.com/spec1560.htm.

400 Series Buccaneer—Bulgin—www.bulgin.com.uk.

V Series—Lemo.

Fisher Pierce—Radio Faulted Circuit Indicator System—(1999)—Joslyn Hi-Voltage http://www.joslynhivoltage.com/PDFFiles/RFCI.pdf.

* cited by examiner

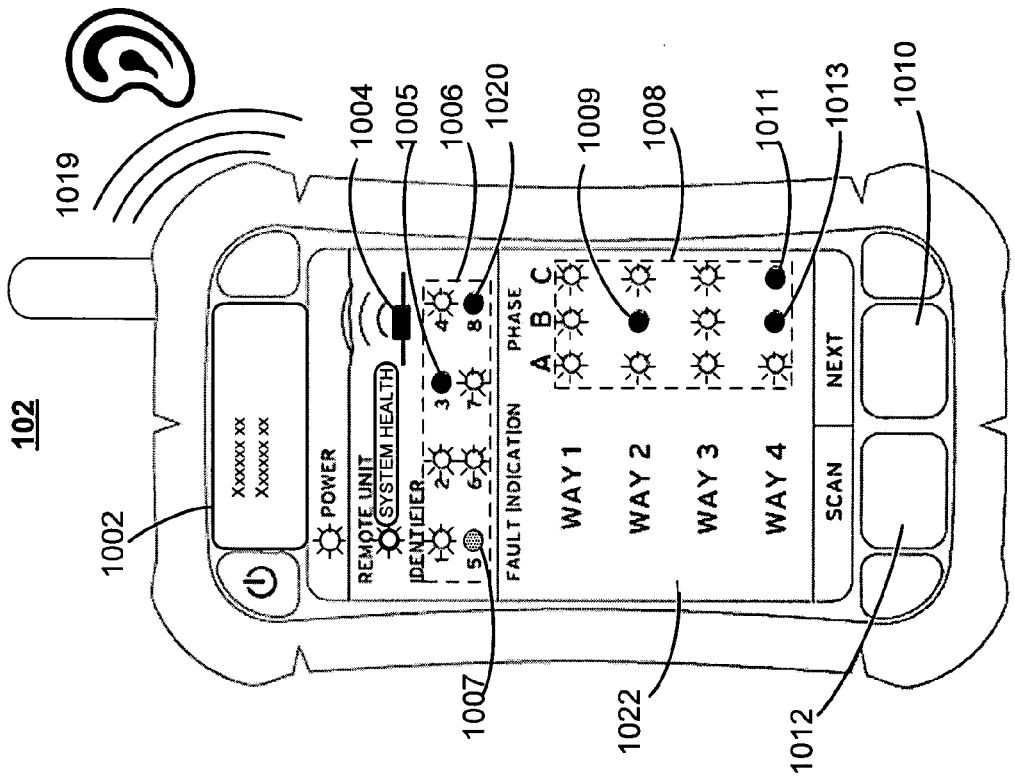
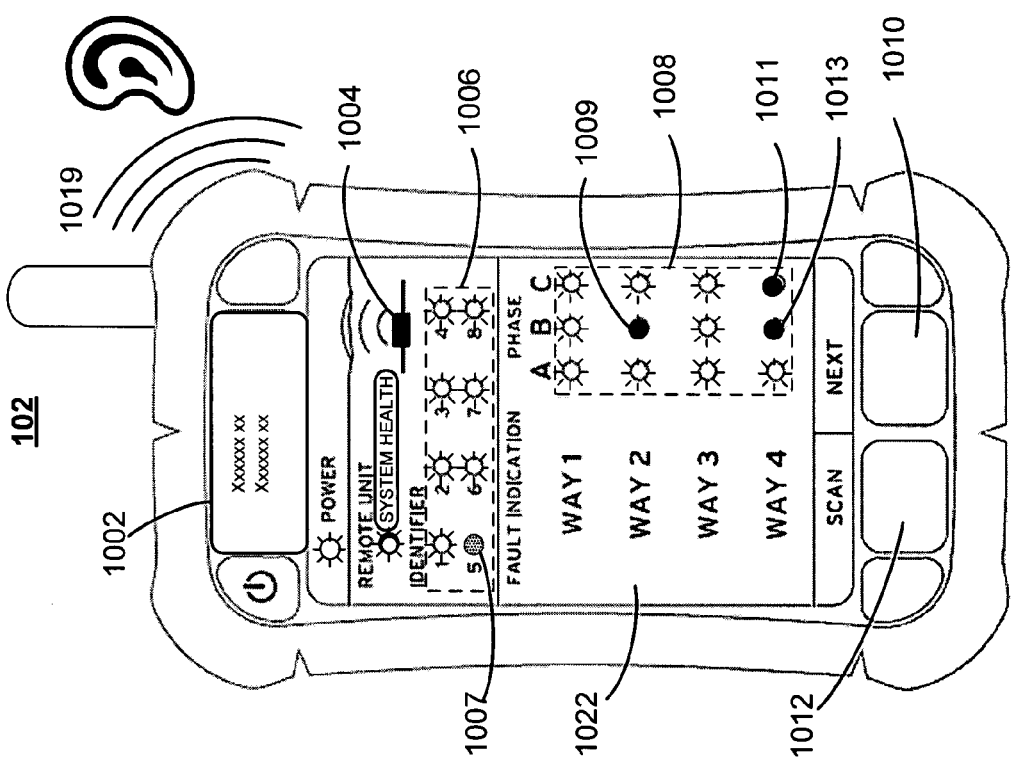
FIG. 3D
FIG. 3C

USER INTERFACE FOR MONITORING A PLURALITY OF FAULTED CIRCUIT INDICATORS

CROSS-REFERENCE TO RELATED APPLICATIONS

This application claims benefit under 35 U.S.C. §119(e) of U.S. Provisional Application entitled "USER INTERFACE FOR MONITORING A PLURALITY OF FAULTED CIRCUIT INDICATORS," filed on May 19, 2006, having Ser. No. 60/802,076, naming Edmund O. Schweitzer III, Luther S. Anderson, Mark Bosold, Laurence Virgil Feight and Douglas A. Park as inventors, the complete disclosure thereof being incorporated by reference.

FIELD OF THE INVENTION

The present invention relates generally to a user interface for a wireless device, and more particularly to a user interface for a wireless device used to monitor a plurality of faulted circuit indicators (FCIs).

DESCRIPTION OF THE PRIOR ART

Power transmission and distribution systems may include power system protective, monitoring, and control devices such as protective relays, faulted circuit indicators, and the like. Throughout, the term "power system device" will include any power system protective, monitoring, or control device. Power system device may also be used herein to describe any device associated with devices which protect, monitor or control power systems. For example, faulted circuit indicators and radio interface units associated therewith may be considered a power system device.

Faulted circuit indicators play a vital role in detecting and indicating faults and locations of faulted conductors to decrease the duration of power outages and improve the reliability of power systems throughout the world. Electrical utilities depend on faulted circuit indicators to help their employees quickly locate faulted conductors. Most conventional faulted circuit indicators utilize a mechanical target or a light emitting diode (LED) to provide a visual indication of a faulted conductor. By visually scanning faulted circuit indicators located at a site, an electrical utility crew can quickly locate a fault. Industry statistics indicate that faulted circuit indicators reduce fault location time by 50%-60% versus the use of manual techniques, such as the "refuse and sectionalize" method. Nonetheless, electrical utilities still spend substantial amounts of time and money determining the locations of faults on their networks.

Electrical utilities rely on a number of additional techniques to further decrease time spent locating faults. For instance, modern faulted circuit indicators frequently have one or more contact outputs that activate on the detection of a fault. These contact outputs can be connected to a Supervisory Control and Data Acquisition ("SCADA") system, allowing remote monitoring of a given faulted circuit indicator's status. This technique works well for above-ground sites, where a cable from the faulted circuit indicator to a monitoring device can be installed, and the monitoring device can be connected to a remote site by a communications line. However, this technique is expensive for underground sites, where an underground communications line must be installed.

Another recent advancement is the use of radio frequency ("RF") technology within faulted circuit indication systems.

In one prior art system, each faulted circuit indicator communicates with a radio interface unit which communicates the occurrence of a fault to an external receiver. The radio interface unit is often located in proximity to an FCI within an underground vault, which is susceptible to external elements. For example, vaults may often be filled with water thereby exposing the radio interface unit located therein to extreme humidity, which over time can degrade the operation of electronic circuits within FCIs. In another example, for overhead FCI systems, radio interface units are also exposed to the external elements as they are situated in proximity to the overhead FCI device.

More specifically, in one prior art system, each faulted circuit indicator contains a two-way radio that communicates the occurrence of a fault to an intelligent module installed within about 100 feet from the faulted circuit indicator. The intelligent module then uses the existing telephone network to communicate a fault occurrence to a remote site, triggering the dispatch of a team to the fault site. However, this system is vulnerable to phone network outages. In addition, a crew dispatched to the fault site must then monitor a readout located on the intelligent module to ensure that the fault has been properly cleared. As the intelligent modules are frequently located on power line poles, viewing an intelligent module's readout may be inconvenient.

An improvement on this system is the use of a wireless device to monitor radio signals from RF equipped faulted circuit indicators that are connected to a radio interface unit. Using a wireless device, a utility crew can locate a fault and determine when the fault has been properly cleared by monitoring the display of the wireless device. However, conventional wireless devices provide no indication as to whether a particular faulted circuit indicator is actually connected to the radio interface unit. In addition, prior art devices do not display the status of a plurality of or multiple groups of faulted circuit indicators simultaneously.

Accordingly, one object of this invention is to provide a user interface for a wireless device that simultaneously displays the status of multiple groups of monitored faulted circuit indicators.

Another object of this invention is to provide an indication on a wireless device of whether a faulted circuit indicator is connected to a remote monitoring device, such as a radio interface unit.

SUMMARY OF THE INVENTION

The disclosed invention achieves its objectives through a user interface for a wireless device that is adapted for monitoring the occurrence of a fault detected by a faulted circuit indicator. The wireless device is adapted to distinguish among a plurality of faulted circuit indicators situated in particular groups. Each group of faulted circuit indicators is associated with a particular radio interface unit having an identification setting associated therewith. The user interface includes a radio identification indicator with a plurality of radio interface unit status indicators, wherein each radio interface unit status indicator corresponds to a particular radio interface unit, and where the radio identification indicator is adapted to display status information corresponding to a radio interface unit selected by a user. The user interface also includes a group indicator comprising a plurality of FCI status indicators, wherein each FCI status indicator corresponds to a particular FCI coupled to the particular radio interface unit. Each FCI status indicator indicates whether the corresponding FCI is faulted, not faulted, or not installed.

In another embodiment, the user interface makes use of a speaker to communicate the assertion of fault conditions by the monitored faulted circuit indicators.

In yet another embodiment, a user interface for a wireless device is provided for monitoring a plurality of sensor probes. The sensor probes are situated in groups, wherein each group of sensor probes is associated with a particular radio interface unit. The user interface includes a radio interface unit status indicator and a sensor probe status indicator. The radio interface unit status indicator generally displays selected status information corresponding to a selected radio interface unit. A sensor probe status indicator corresponding to a particular sensor probe is coupled to the particular radio interface unit. The sensor probe status indicator displays status information corresponding to the particular sensor probe, including the detection of CO, $CO_2$, $SO_x$, $NO_x$, Ammonia, Arsine, Bromine, Chlorine, Chlorine Dioxide, volatile organic compounds, Diborane, Ethylene Oxide, Fluorine, Formaldehyde, Germane, Hydrogen, Hydrogen Chloride, Hydrogen Cyanide, Hydrogen Fluoride, Hydrogen Selenide, Hydrogen Sulfide, Oxygen, Ozone, Methane, Phosgene, Phosphine, Silane, pressure, temperature, electromagnetic radiation, atomic radiation, smoke, particulate matter, pH, turbidity, $Br^-$, $Ca^{2+}$, $Cl^-$, $CN^-$, $Cu^{2+}$, $F^-$, $I^-$, $K^+$, $Na^+$, $NH^{4+}$, $NO^{3-}$, $Pb^{2+}$, $S^-(AG^+)$, conductivity, over voltage, under voltage, over current, under current, or frequency.

BRIEF DESCRIPTION OF THE DRAWINGS

Although the characteristic features of this invention will be particularly pointed out in the claims, the invention itself, and the manner in which it can be made and used, can be better understood by referring to the following description taken in connection with the accompanying drawings forming a part hereof, wherein like reference numerals refer to like parts throughout the several views and in which:

FIG. 3C illustrates the same wireless device user interface FIG. 3A where a number of faulted circuit indicators attached to the selected radio interface unit are asserting a fault condition.

FIG. 3D illustrates the same wireless device user interface FIG. 3A where, in addition to the selected radio interface unit, two other radio interface units are coupled to one or more faulted circuit indicators asserting a fault condition.

DETAILED DESCRIPTION OF THE ILLUSTRATED EMBODIMENT

Figure 1:
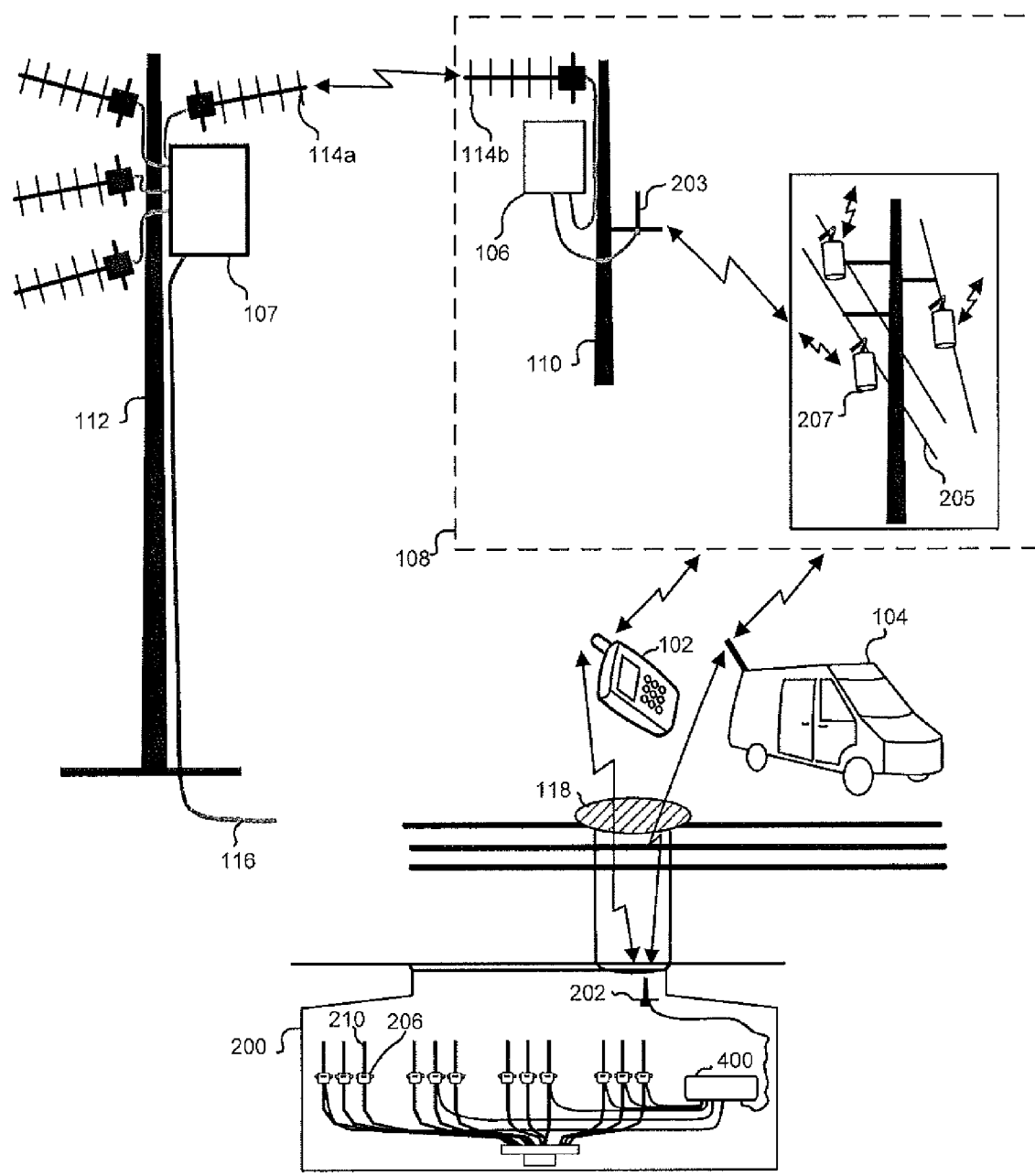
FIG. 1 illustrates a system view of a faulted circuit indicator monitoring system in accordance with an aspect of the present invention.

FIG. 1 illustrates a faulted circuit indicator monitoring system in accordance with an aspect of the present invention. A number of overhead faulted circuit indicators 207 each contain a two-way radio that communicates the occurrence of a fault via a short range antenna 203 to a local site 110 having an intelligent module 106 installed within radio range of the faulted circuit indicators 207. The intelligent module then uses the existing wired telephone network (not shown) to communicate the fault occurrence to a remote site 112. Alternatively, the intelligent module may include a radio interface unit associated therewith for communication with an antenna 114b to communicate the fault occurrence to a remote site 112 having another long range RF antenna 114a. The remote site 112 includes a remote intelligent module 107, which may be connected to another site (not shown) via a wired connection 116. When a fault is detected by a faulted circuit indicator, the occurrence is relayed in the manner described above to the remote site 112, triggering the dispatch of a team to the fault site. The user then uses a wireless device 102 (e.g., a wireless handheld device). In another embodiment, the wireless device may be located in a vehicle 104 to determine which conductor 205 is faulted.

Note that the conductors could also be located in an underground vault 200, which may be accessible through a manhole 118. Faulted circuit indicators 206 attached to the underground conductors 210 are wired to a radio interface unit 400 with a short range antenna 202 to communicate with the wireless device 102 or wireless device installed in a vehicle 104. In one embodiment, the short range antenna 202 may be part of or separate from the radio interface unit.

Figure 2A:
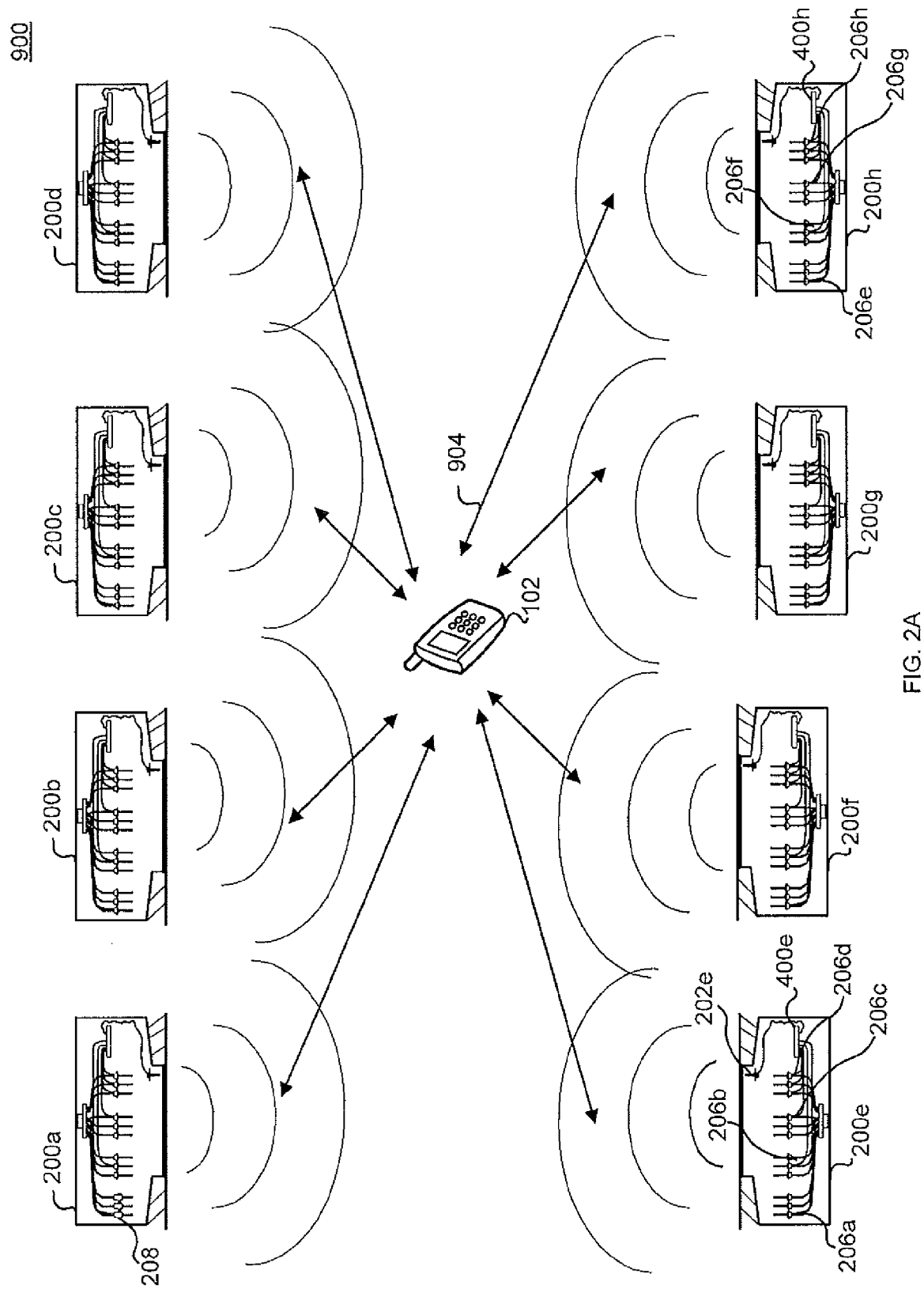
FIG. 2A illustrates a wireless device communicating with eight radio interface units, each of which is connected to four groups of faulted circuit indicators in accordance with an aspect of the present invention.
Figure 2B:
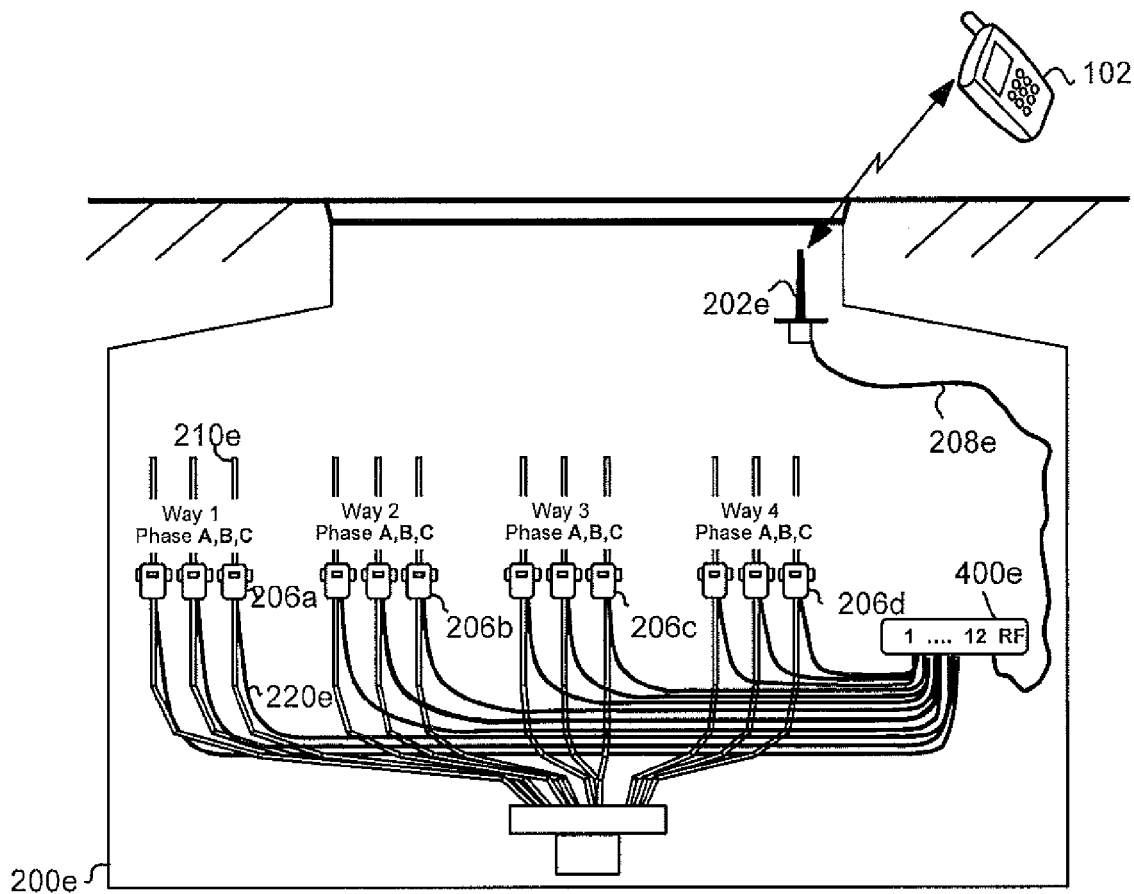
FIG. 2B illustrates the underground vault 200e of FIG. 2A.

Referring to the drawings and to FIGS. 2A and 2B in particular, a wireless device 102 communicates 904 with eight installations of faulted circuit indicators 200a-200h. As illustrated, each installation of faulted circuit indicators consists of a radio interface unit, and four separate groups ("ways") of faulted circuit indicators, wherein each group has three faulted circuit indicators, one for each phase. For example, the installation shown at 200e, as shown in FIGS. 2A and 2B includes four separate groups 206a-d of faulted circuit indicators connected to a radio interface unit 400e through cables 220e with a separate short range antenna 202e connected through cable 208e. This radio interface unit 400e may include a particular setting such that it may be differentiated from the other radio interface units. For example, this identification setting may be in the form of a designation setting (e.g., serial number), whereupon each particular radio interface unit has a particular designation (e.g., a particular serial number). In another embodiment, the identification setting may be in the form of an address setting (e.g., a media access control (MAC) address). In yet another embodiment, in order to ensure proper differentiation among a plurality of units, each radio interface unit may include both a designation setting and an address setting. For example, both the radio interface unit 400b and radio interface unit 400e may be associated with a particular address (e.g., address 5). In order to differentiate between these radio interface units 400b and 400e, each radio interface unit 400b and 400e is given a particular designation setting (e.g., particular serial numbers). In this way, radio interface units may be differentiated.

Each faulted circuit indicator within these separate groups 206a-d may be used to monitor the various phases (e.g., commonly referred to as the A, B, C phases) associated therewith. For example, each of the faulted circuit indicators associated with way 206a may be used to monitor the three phases associated therewith. Through this system, the installation 200e of faulted circuit indicators 206a, 206b, 206c, 206d may communicate with wireless device 102.

Additionally, the wireless device 102 may alternatively be adapted to communicate with radio interface units associated with overhead fault circuit indicators as illustrated in FIG. 1.

In yet another embodiment, the wireless device may be in the form of a personal digital assistant (PDA) with a wireless interface, a laptop computer or a handheld computer with a wireless interface, etc. and may optionally be mounted in a service vehicle.

Figures 3A, 3B:
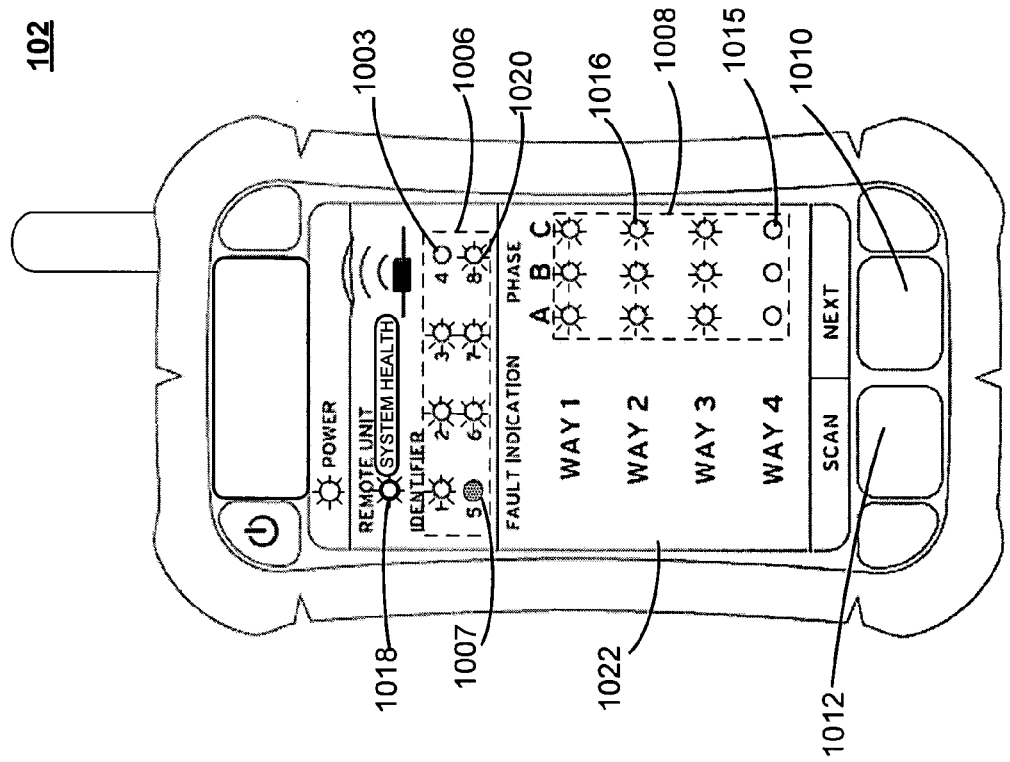
FIG. 3A illustrates the user interface of a wireless device of FIGS. 2A and 2B used to scan a number of groups of faulted circuit indicators connected to separate radio interface units for their status.
FIG. 3B illustrates the same wireless device user interface of FIG. 3A after a scan operation has been completed.

FIG. 3A illustrates an example of a user interface of the wireless device 102 that may be used in the systems illustrated in FIGS. 2A and 2B. The user interface includes a power indicator 1001, such as a green LED, which is illuminated when the wireless device 102 is turned on via power button 1024. In addition, the user interface includes two controls, an information acquisition control which is implemented as a "scan" button 1012, and an identification setting increment control which is implemented as a "next" button 1010. The "scan" button 1012 causes the wireless device 102 to scan the nearby area for any radio interface units (e.g., those associated with the installation of faulted circuit indicators of FIGS. 2A and 2B) that may be present. During the scan, each radio interface unit may be adapted to communicate its identification setting (e.g., address), its status, and the status of any faulted circuit indicators that are connected to it.

Once a scan is completed, a summary of the scan is displayed on a radio address indicator 1006. The radio address indicator 1006 comprises a plurality of radio interface unit status indicators. Each LED of the radio address indicator 1006 may correspond to each radio interface unit associated with each one of the installations of faulted circuit indicators 200a-h of FIGS. 2A and 2B. The radio interface unit status indicators may be implemented using eight tri-color LEDs. Depending on the result of the scan operation, the LEDs within the radio address indicator 1006 will be illuminated in different ways. If a radio interface unit with a particular address is not detected, then the radio address indicator 1006 LED with the corresponding address will not be illuminated. Conversely, for each radio interface unit detected, a corresponding LED within the radio address indicator 1006 will display amber, green or red. A particular LED within the radio address indicator 1006 displays green if none of the faulted circuit indicators connected to the particular radio interface unit have detected a fault. Conversely, a particular LED within the radio address indicator 1006 displays red if any of the faulted circuit indicators connected to the corresponding radio interface unit have detected a fault. As discussed later, a particular LED may be illuminated as amber if the corresponding radio interface unit is presently selected as discussed below.

The "next" button 1010 allows a user of the wireless device 102 to sequentially step through each of the radio interface units that the wireless device 102 detected during its last scan operation. The user interface of the wireless device 102 also includes a group (way) indicator 1022, which displays the status of any group of faulted circuit indicators connected to the radio interface unit presently monitored by the wireless device 102. The group (way) indicator 1022 includes a plurality of faulted circuit indicator status indicators, which as shown, are twelve LEDs 1008. The twelve LEDs are organized in four rows, each corresponding to one of four separate groups (ways) of faulted circuit indicators, and three columns, each corresponding to a separate phase 1014. For example, if the user were to select the display for radio interface 400e of FIGS. 2A and 2B, the group (way) indicators 1022 will correspond to each group of faulted circuit indicators 206a-d, whereas if the user were to select the display for radio interface 400h of FIGS. 2A and 2B, the group (way) indicators 1022 will correspond to each group of faulted circuit indicators 206e-h. As discussed above, each of the faulted circuit indicators associated with the particular group (or way) are generally associated with different phases (e.g., A, B, C phases) and accordingly will correspond to the LEDs 1008.

During operation, if a particular faulted circuit indicator is not faulted, the corresponding LED will display green. Conversely, if a particular faulted circuit indicator is faulted, the corresponding LED will display red. And if the particular fault circuit indicator is not connected to the corresponding radio status indicator, the corresponding LED will not be illuminated.

The user interface of the wireless device 102 also includes a system health indicator 1018, which displays information about the health of the presently selected radio interface unit. One implementation of the system health indicator 1018 is a bi-color LED, which displays green when there are no issues with the selected radio interface unit, and red when the selected radio interface unit has an issue that requires maintenance. In another embodiment, a tri-color LED may be used to indicate the system life of the radio interface unit. For example, a green color may indicate that greater than one year of system life remains. An amber color may indicate that less than one year of system life remains. A red color may indicate that complete depletion of system life is imminent. In one embodiment, the system life of the radio interface unit may equate to the battery life associated therewith.

FIG. 3B illustrates an embodiment of the disclosed user interface 102 after a scan operation has been completed, and the "next" button has been pushed to display the status of the faulted circuit indicators attached to the radio interface unit with address 5 (e.g., 400e of FIG. 2). Among others, the radio interface unit with address 8 has reported as problem free as indicated by the LED 1020 being illuminated as green. Also, the radio interface unit with address 4 indicates that that unit is either not installed, or the radio within the radio interface unit has malfunctioned, as indicated by the unlit LED 1003.

For illustration purposes, the status of the faulted circuit indicators attached to the radio interface unit with address 5 (e.g., 400e of FIG. 2), are being displayed in the group (way) indicator 1022. This is indicated by LED 1007, which is displayed as amber in the illustrated embodiment. All faulted circuit indicators in group or way 1 (e.g., 206a of FIGS. 2A and 2B), group or way 2 (e.g., 206b of FIGS. 2A and 2B), and group or way 3 (e.g., 206c of FIG. 2) are installed, and none have detected faults. Therefore, the particular LEDs corresponding to those faulted circuit indicators are illuminated green. For instance, the LED 1016 corresponding to way 2 (e.g., 206b of FIGS. 2A and 2B), phase C is illuminated green. In addition, the group (way) indicator 1022 indicates that none of the faulted circuit indicators corresponding to group or way 4 (e.g., 206d of FIGS. 2A and 2B) are installed. In the illustrated embodiment, this is indicated with an unlit LED, such as the LED 1015 corresponding to group or way 4, phase C. Because, the faulted circuit indicators corresponding to group or way 4 (206d) are shown to be connected in FIGS. 2A and 2B, this may indicate a problem in the connection of the faulted circuit indicators.

In FIG. 3C, the status of the faulted circuit indicators attached to the radio interface unit with address 5 are being displayed. However, during the previous scan, a number of the faulted circuit indicators attached to the radio interface unit with address 5 reported a fault condition. For instance, LEDs 1009, 1011, and 1013 all indicate that the faulted circuit indicators corresponding to those LEDs reported a fault. For illustration purposes, the faulted circuit indicator associated with phase B of group or way 2 (e.g., 206b of FIG. 2) is faulted whereas the faulted circuit indicators associated with phases A and C of group or way 2 (e.g., 206d of FIG. 2) are connected and not faulted.

According to one embodiment, the user interface 102 will display on the group (way) 1022 and phase 1008 indicators the status of the faulted circuit indicators attached to the radio interface unit that first reports a faulted circuit. If none of the radio interface units report a faulted circuit, then the user interface 102 will display on the group (way) 1022 and phase 1008 indicators the status of the faulted circuit indicators attached to the radio interface unit with the lowest numbered address. For example, FIG. 3D indicates that at least one faulted circuit indicator attached to radio interface unit at address 3 reports a fault, as well as at least one faulted circuit indicator attached to radio interface unit at address 8. As soon as the radio interface unit with address 3 reports a fault, the status of the faulted circuit indicators connected to the radio interface unit associated with address 3 will be displayed on the group (way) and phase 1022, 1008 indicators. In order to view the status of the faulted circuit indicators attached to the radio interface unit at address 8, the "next" button 1010 may be pushed enough times to scroll to that report.

During operation, a user will approach an area with one or more groups of faulted circuit indicators installed. The user will then start a scan operation using the wireless device 102 by pressing the "scan" button 1012. The radio address indicator 1006 will provide an overview of the status of the faulted circuit indicators attached to the different radio interface units. For those radio interface units with no attached faulted circuit indicators asserting a fault condition, the corresponding LEDs within the radio address indicator will display green. Conversely, for those radio interface units attached to faulted circuit indicators which have asserted a fault, the corresponding LEDs within the radio address indicator will display red. And for those radio interface units which are not installed or which have radio communication, the corresponding LEDs within the radio address indicator will not be illuminated.

The way indicator 1022 will display the status of the radio interface unit that reported a fault. If none of the radio interface units report a faulted circuit, then the user interface 102 will display on the group (way) 1022 and phase 1008 indicators the status of the faulted circuit indicators attached to the radio interface unit with the lowest numbered address of those received. This radio interface is indicated within the radio address indicator by the corresponding LED being illuminated amber within the radio address indicator 1006. The user may view the scan results for a different radio interface unit by pressing the "next" button 1010, which selects the radio interface unit with the next lowest address, until the desired radio interface unit is selected. Using this technique, the user can determine if any faulted circuit indicators are asserting a fault within range of the wireless device. The user can also tell if any radio interface units are malfunctioning due to a low battery or other reason. The system health indicator 118 will show the system health of the radio interface unit currently being displayed according to the radio address indicator 1006. And the user can determine if a faulted circuit indicator has become disconnected from the appropriate radio interface unit. All of the above can be done without accessing any of the faulted circuit indicators, which can result in enormous time savings, particularly when dealing with underground installations.

In yet another embodiment, the handheld wireless device 102 may be adapted to indicate an interference or collision of signals received from more than one radio interface device. For example, LEDs associated with the radio address indicator 1006 may flash between two colors to indicate that at least two signals have been received from radio interface devices having different unique serial numbers but using the same address in the vicinity. In one embodiment, an LED associated with radio address indicator 1006 may flash between green and amber to signal that neither radio interface unit contains a fault. Alternatively, an LED associated with radio address indicator 1006 may flash between red and amber to signal that at least one of the radio interface units contains a fault. When selecting the display for the address in which a collision has occurred, the way 1022 and phase 1008 indicators may alternate between indications for the data of each of the radio interface units. In yet another embodiment, a particular designation may be shown (e.g., a particular serial number associated with a particular radio interface unit) in order to differentiate between two radio interface units having the same address.

In addition to the wireless devices LED display, the user interface may further include other means for communicating information. Such information may include, but is not limited to, radio interface unit address, radio interface unit serial number, faulted circuit indicator status, faulted circuit indicator fault location, diagnostic parameters, firmware revisions, radio interface unit health, counter information, radio interface unit GPS position, handheld device GPS position, navigation information or any other information. In one embodiment, the additional communication means may be a liquid crystal display (LCD) as shown in 1002 on FIGS. 3A-3D.

In another embodiment, the communication means may be a speaker 1004. This speaker 1004 can communicate the occurrence of an event 1019 to a user through prerecorded or synthesized messages, chirps, dog barks, beeps, or other sounds. Further, the speaker 1004 may communicate more complicated messages through Morse code. In particular, among other messages, Morse code may be used to communicate the occurrence of a fault by a monitored faulted circuit indicator or the occurrence of low system life in a radio interface unit or a faulted circuit indicator. As Morse code is well known in the art, its particulars are not discussed here.

The foregoing embodiments are drawn toward using faulted circuit indicators 206 as a sensing probe to indicate the presence of a predetermined condition, namely, a faulted circuit. However, because the faulted circuit indicator sends either a positive (fault) or negative (no fault) signal to the radio interface unit 400, any sensing probe that is capable of detecting a predetermined condition and sending a positive or negative signal to the radio interface unit 400 may be used. For example, it may be necessary to communicate information about the temperature inside the vault underground 200. In this embodiment, as illustrated in FIGS. 2A and 2B, instead of using a faulted circuit indicator 206, a temperature transducer 208 may be used as the sensing probe. The temperature transducer 208 may be coupled to the article from which knowledge about the temperature needs to be communicated. The temperature transducer 208 may be configured to send a positive signal in the case that the temperature sensed is either above or below a predetermined threshold. Thus, the user would be able to determine whether the temperature sensed by the transducer 208 was above or below a predetermined level, or if the temperature transducer probe had become disconnected from the radio interface unit 400 by the display of the appropriate LED 1008. For example, if the temperature transducer 208 corresponds to group (way) 4 phase C, the user will understand the state of this probe by the display of the LED in group (way) 4, phase C.

It is envisioned that any type of sensing probe that is capable of sending a positive and a negative signal may be used in conjunction with the radio interface unit of the present device. Some examples of sensing probes that may be used includes, for example: water, high voltage electric field, specific gravity, light, and sound, gas sensors such as CO, CO2, SOx, NOx, Ammonia, Arsine, Bromine, Chlorine, Chlorine Dioxide, VOCs, Combustibles, Diborane, Ethylene Oxide, Fluorine, Formaldehyde, Germane, Hydrogen, Hydrogen Chloride, Hydrogen Cyanide, Hydrogen Fluoride, Hydrogen Selenide, Hydrogen Sulfide, Oxygen, Ozone, Methane, Phosgene, Phosphine, Silane, and the like; pressure sensors for sensing, for example, pressure in a gas line, water line, waste line, oil line, and the like; temperature sensors; electromagnetic radiation sensors; radiation sensors; smoke sensors; particulate matter sensors; liquid phase sensors such as pH, turbidity, Br−, Ca2+, Cl−, CN−, Cu2+, F−, I−, K+, Na+, NH4+, NO3−, Pb2+, S−(AG+), conductivity sensors, and the like; electrical sensors such as under voltage sensors, over voltage sensors, under current sensors, over current sensors, frequency sensors and the like; power factor alarms; demand overload indicators; sensors that detect the presence of primary system voltage; sensors that determine if a sealed subsurface fuse has operated by sensing voltage on each side of fuse element with loss of load current, sensors that sense the open or closed position of a subsurface switch; voltage sensors which monitors status of lead-acid batteries used to run controller or motor operators for subsurface switches; power quality sensors which detect primary voltage swells and sags along the distribution system, and other sensors that detect power quality issues and send an alarm status.

In one embodiment, the various LEDs may function so as to indicate different colors for a colorblind person. For example, if the LEDs are capable of showing red or green, the LED may be programmed to flash for red, and stay constant for green. In this way, a user who cannot otherwise distinguish between red and green would be able to determine if the LED was reporting a red or a green color.

Figure 4:
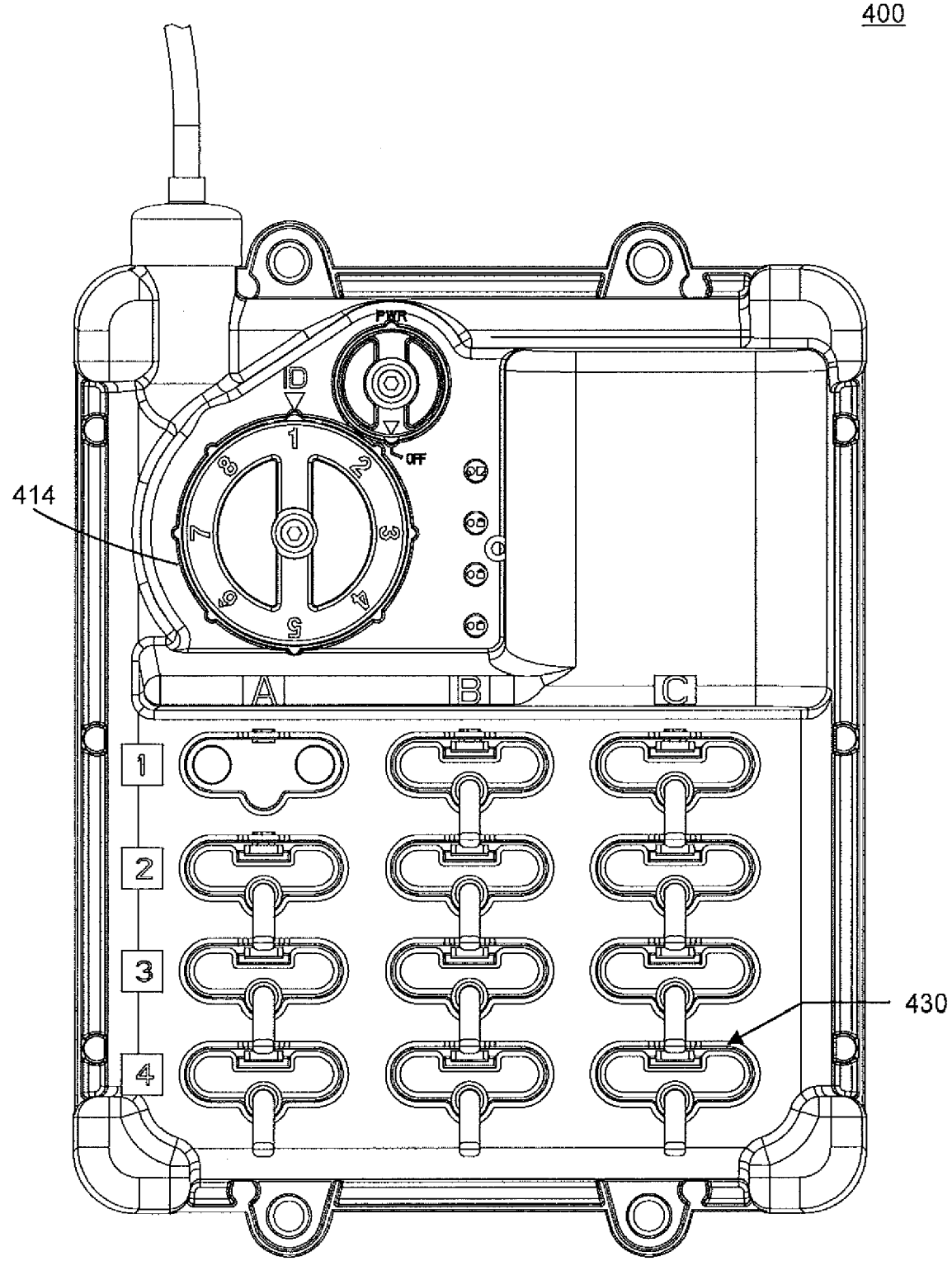
FIG. 4 illustrates an example of a radio interface unit as described in the previous figures.

FIG. 4 illustrates an example of a radio interface unit 400 as described in the previous embodiments. As illustrated in FIG. 4, the address of each radio interface unit 400 may be set using address switch 414. Moreover, various FCIs may be connected to the radio interface unit 400 (e.g., via a connection at 430). Each connection corresponds to the group (way) and phase to which the particular FCI corresponds. For example, an FCI connected at 430 would correspond to phase C of way 4. Using this address and connection scheme, the radio interface unit 400 may communicate appropriate power system information to a wireless apparatus 102 in accordance with the teachings of the present invention as described above.

The foregoing description of the invention has been presented for purposes of illustration and description, and is not intended to be exhaustive or to limit the invention to the precise form disclosed. The description was selected to best explain the principles of the invention and practical application of these principles to enable others skilled in the art to best utilize the invention in various embodiments and various modifications as are suited to the particular use contemplated. It is intended that the scope of the invention not be limited by the specification, but be defined by the claims set forth below.

We claim:

1. A user interface for a wireless device for monitoring the occurrence of a fault on monitored equipment detected by a faulted circuit indicator, wherein the wireless device is adapted to distinguish among a plurality of faulted circuit indicators situated in groups and each group of faulted circuit indicators being associated with a particular radio interface unit having an identification setting associated therewith, the user interface comprising;
   i) a radio address indicator comprising a plurality of radio interface unit status indicators, wherein each radio interface unit status indicator corresponds to a particular radio interface unit, and wherein the radio address indicator is adapted to display status information related to the particular radio interface unit; and
   ii) a group indicator comprising a plurality of faulted circuit indicator status indicators, wherein each faulted circuit indicator status indicator corresponds to a particular faulted circuit indicator coupled to the particular radio interface unit,
   wherein each radio interface unit status indicator indicates whether the particular radio interface unit is coupled to a faulted circuit indicator.

2. The user interface of claim 1, wherein each radio interface unit status indicator is a light-emitting diode or a liquid crystal display (LCD).

3. The user interface of claim 1, wherein each faulted circuit indicator status indicator is a light-emitting diode or a liquid crystal display (LCD).

4. The user interface of claim 1, wherein each faulted circuit indicator status indicator indicates whether the corresponding faulted circuit indicator is faulted, not-faulted, or not-connected.

5. The user interface of claim 1, further comprising an increment control adapted to change the selected status indicator in response to input from a user.

6. The user interface of claim 1, further comprising a speaker.

7. The user interface of claim 6, wherein the speaker communicates information through Morse Code.

8. The user interface of claim 1, further comprising a liquid crystal display.

9. The user interface of claim 1, wherein each radio address indicator indicates an address interference between two radio interface units.

10. The user interface of claim 9, wherein each radio address indicator indicates an designation for distinguishing between two radio interface units having a same address associated therewith.

11. The user interface of claim 1, wherein each faulted circuit indicator status indicator corresponds to a particular phase associated therewith.

12. The user interface of claim 1, wherein the user interface is situated on a single handheld device.

13. The user interface of claim 1, wherein the wireless device is selected from the group consisting of a personal digital assistant (PDA) with a wireless interface, a laptop computer and a handheld computer with a wireless interface.

14. The user interface of claim 1, wherein the faulted circuit indicator is either an overhead or an underground faulted circuit indicator.

15. The user interface of claim 1, further including a system health indicator for providing the health of either the radio interface unit or the faulted circuit indicator.

16. The user interface of claim 1, further comprising an indicator for providing an indication of an interference between multiple radio interface units or an indication of a collision of signals received from more than one radio interface device.

17. A user interface for a wireless device indicating whether a faulted circuit indicator for monitoring for faults on monitored equipment is connected to a radio interface unit, the user interface comprising:

at least one radio interface unit status indicator corresponding to the radio interface unit, and adapted to indicate whether the faulted circuit indicator is connected to the radio interface unit.

18. The user interface of claim 17, wherein the radio interface unit status indicator is a light-emitting diode or a liquid crystal display (LCD).

19. The user interface of claim 17, further comprising a speaker.

20. The user interface of claim 19, wherein the speaker communicates information through Morse Code.

21. The user interface of claim 19, wherein the speaker communicates information using a communication mechanism selected from the list consisting of prerecorded messages, synthesized messages, chirps, dog barks, and beeps.

22. The user interface of claim 17, further comprising a liquid crystal display.

23. The user interface of claim 17, wherein the user interface is situated on a single handheld device.

24. The user interface of claim 17, wherein the wireless device is selected from the group consisting of a personal digital assistant (PDA), a laptop computer and a handheld computer with a wireless interface.

25. The user interface of claim 17, wherein the faulted circuit indicator is either an underground or overhead faulted circuit indicator.

26. The user interface of claim 17, further comprising an indicator for providing an indication of an interference between multiple radio interface units or a collision of signals received from more than one radio interface device.

27. A user interface for a wireless device for monitoring a plurality of faulted circuit indicators, wherein the faulted circuit indicators are situated in particular groups, each group of faulted circuit indicators being associated with a particular radio interface unit, the user interface comprising:
  i) a radio interface unit status indicator corresponding to a particular radio interface unit, and displaying status information corresponding to the particular radio interface unit;
  ii) a faulted circuit indicator status indicator corresponding to a particular faulted circuit indicator coupled to a particular radio interface unit, and displaying status information corresponding to the particular faulted circuit indicator; and
  iii) wherein the faulted circuit indicator status indicator indicates whether the particular radio interface unit is coupled to the particular faulted circuit indicator.

28. The user interface of claim 27, wherein the radio interface unit status indicator is a light-emitting diode.

29. The user interface of claim 27, wherein the faulted circuit indicator status indicator is a light-emitting diode.

30. The user interface of claim 27, wherein the radio interface unit status indicator reports its status on a liquid crystal display.

31. The user interface of claim 27, wherein the faulted circuit indicator status indicator reports its status on a liquid crystal display.

32. The user interface of claim 27, wherein the radio interface unit status indicator reports its status through a speaker.

33. The user interface of claim 27, wherein the faulted circuit indicator status reports its status through a speaker.

34. The user interface of claim 27, wherein the status information displayed by the radio interface unit status indicator is selected from the group consisting of a radio interface unit address, a radio interface unit identification setting, a radio interface unit designation, a radio interface unit serial number, a radio interface unit health indication, a counter information, a radio interface unit GPS position, one or more diagnostic parameters, and firmware revisions.

35. The user interface of claim 27, wherein the status information displayed by the faulted circuit indicator status indicator is selected from the group consisting of a faulted circuit indicator status, a faulted circuit indicator fault location, one or more diagnostic parameters, firmware revisions, a counter information, and a faulted circuit indicator position.

36. The user interface of claim 27, wherein each faulted circuit indicator status indicator displays information regarding a particular phase associated with the faulted circuit indicator.

37. The user interface of claim 27, wherein the user interface is situated on a single handheld device.

38. The user interface of claim 27, wherein the wireless device is selected from the group consisting of a personal digital assistant (PDA), a laptop computer and a handheld computer with a wireless interface.

39. The user interface of claim 27, wherein the faulted circuit indicator is either an underground or overhead faulted circuit indicator.

40. The user interface of claim 27, further including a system health indicator for monitoring the health of either the radio interface unit or the faulted circuit indicator.

41. The user interface unit of claim 40, wherein the system health indicator provides status information relating to the battery life of the radio interface unit.

42. The user interface of claim 27, further comprising an indicator for providing an indication of an interference between multiple radio interface units or collision of signals received from more than one radio interface device.

43. A user interface for a wireless device for monitoring a plurality of sensor probes, wherein the sensor probes are situated in particular groups, each group of sensor probes being associated with a particular radio interface unit, the user interface comprising:
  i) a radio interface unit status indicator corresponding to a particular radio interface unit, and displaying selected status information corresponding to the particular radio interface unit;
  ii) a sensor probe status indicator corresponding to a particular sensor probe coupled to a particular radio interface unit, and displaying selected status information corresponding to the particular sensor probe; and
  iii) wherein the sensor probe status indicator indicates whether the particular radio interface unit is coupled to the particular sensor probe.

44. The user interface of claim 43, wherein the sensor probe is a faulted circuit indicator.

45. The user interface of claim 43, wherein the sensor probe includes one selected from the list consisting of sensors for detecting: CO, $CO_2$, $SO_x$, $NO_x$, Ammonia, Arsine, Bromine, Chlorine, Chlorine Dioxide, volatile organic compounds, Diborane, Ethylene Oxide, Fluorine, Formaldehyde, Germane, Hydrogen, Hydrogen Chloride, Hydrogen Cyanide, Hydrogen Fluoride, Hydrogen Selenide, Hydrogen Sulfide, Oxygen, Ozone, Methane, Phosgene, Phosphine, Silane, pressure, temperature, electromagnetic radiation, atomic radiation, smoke, particulate matter, pH, turbidity, $Bf^-$, $Ca^{2+}$, $Cl^-$, $CN^-$, $Cu^{2+}$, $F^-$, $I^-$, $K^+$, $Na^+$, $NH^{4+}$, $NO^{3-}$ $Pb^{2+}$, $S^-$ ($AG^+$), conductivity, over voltage, under voltage, over current, under current, frequency, water, high voltage electric field, specific gravity, light, and sound.

* * * * *